Nov. 29, 1966  J. A. WEISS  3,289,110
NON-RECIPROCAL MULTI-ELEMENT TEM TRANSMISSION LINE DEVICE
Filed Jan. 27, 1964                                      2 Sheets-Sheet 1

INVENTOR.
JERALD A. WEISS
BY Robert T. Dunn
ATTORNEY

Nov. 29, 1966   J. A. WEISS   3,289,110
NON-RECIPROCAL MULTI-ELEMENT TEM TRANSMISSION LINE DEVICE
Filed Jan. 27, 1964   2 Sheets-Sheet 2

INVENTOR.
JERALD A. WEISS
BY
*Robert T. Dunn*
ATTORNEY

United States Patent Office 3,289,110
Patented Nov. 29, 1966

3,289,110
NON-RECIPROCAL MULTI-ELEMENT TEM
TRANSMISSION LINE DEVICE
Jerald A. Weiss, Wayland, Mass., assignor to Massachusetts Institute of Technology, Cambridge, Mass., a corporation of Massachusetts
Filed Jan. 27, 1964, Ser. No. 340,441
7 Claims. (Cl. 333—24.1)

This invention relates to non-reciprocal transmission devices and more particularly to a device for conducting high frequency radio waves in the proximity of a body of ferromagnetic material, whereby transmission of the waves is non-reciprocal.

Heretofore, materials which exhibit ferromagnetic resonance have been employed to intercept high frequency radio (RF) waves and cause transmission of the waves to be non-reciprocal. One type of material having ferromagnetic resonance characteristics is generally referred to as ferrite material and is composed in part of iron and other materials which are selected in view of the resonance characteristics desired. When a body of ferrite material is magnetized in a given direction and disposed to intercept high frequency radio waves having a component of circular or elliptical polarization, an interaction occurs between the radio wave and the magnetized ferrite material. The nature of this interaction depends upon the frequency of the radio wave, the characteristics of the ferrite material, the magnitude of the magnetizing magnetic field applied to the ferrite material and the relative directions of the magnetizing and wave fields.

Generally two types of non-reciprocal effects are achieved. The first effect is that wave energy absorption is not reciprocal so that insertion loss through the device is substantially non-reciprocal. The second effect is that wave phase shift is not reciprocal and so a substantial differential phase shift occurs. Both types of non-reciprocal actions can be switched or reversed by reversing the direction of the magnetization of the ferrite material. There is considerable information available in the art to teach techniques for selecting the ferrite material and selecting the magnitude of the magnetizing field in view of the frequency of operation of the device to achieve either of these two effects. The present invention relates to a structure whereby either of these two effects can be achieved. The present invention is particularly concerned with a unique structure for conducting high frequency radio waves and producing in at least a part thereof circularly or elliptically polarized components of the magnetic fields of the waves. The device further includes bodies of ferrite material suitably located within the device and one embodiment includes a unique method for controlling the direction of magnetization of these ferrite bodies without requiring the use of external magnets and coils. Therefore, it is one object of the present invention to provide a non-reciprocal transmission device including bodies of material exhibiting ferromagnetic resonance characteristics which intercept fields of high frequency radio waves.

It is a feature of the present invention to provide a multi-element transmission line for conducting radio frequency waves in substantially a TEM mode and to conduct the waves through the device along a plurality of paths such that magnetic fields of waves conducted along different paths are substantially transverse to each other in selected areas and in phase quadrature so as to produce circularly polarized components of RF magnetic field and, further, to dispose magnetized ferrite material in the areas to cause a non-reciprocal transmission effect.

Specific embodiments of the present invention operating as a switchable differential phase shifter include sections of three element strip transmission line with a plurality of quarter wavelength fingers extending from the center conductor thereof. The fingers are preferably equally spaced from each other and disposed in the same plane as the center conductor so that areas of circularly polarized RF magnetic field are produced between the fingers. Suitably shaped bodies of magnetized ferrite material in a remanence state are located at these areas, causing RF waves conducted through the transmission line to experience non-reciprocal phase shift. The direction of this non-reciprocal shift is switched by passing a pulse of D.C. current through the center conductor to reverse the direction of the remanent magnetization.

These and other features and objects of the invention will be apparent from the following specific description of the embodiments of the invention taken in conjunction with the figures in which.

The present invention is applicable to all types of multi-element high frequency wave transmission lines and particularly to the type of line generally referred to as strip transmission lines, wherein a central electrical conductor is disposed between two ground plane conductors and propagation is in the TEM mode. In accordance with features of the invention, the center conductor includes parts which conduct waves along different adjacent paths in such a manner that the fields of these waves are transverse to each other in some areas. The paths are so designed that at the areas where the fields of the waves are transverse, the waves are out of phase and preferably in phase quadrature. This produces circularly or ellipitically polarized wave fields in these areas which will interact with a suitably magnetized body of ferrite material located at the areas. Such interaction is the cause of non-reciprocal transmission qualities. A second important feature of the invention is concerned with the manner in which the ferrite bodies are magnetized.

Ferromagnetic interaction occurs when the plane of the circularly polarized RF magnetic fields lie substantially transverse to the direction of magnetization of the ferrite material. Therefore, the direction of magnetization of the ferrite body must be established in consideration of this requirement. In some embodiments of the present invention the direction of magnetization of the ferrite bodies is switched without the use of external magnets or coils. This is accomplished by generating the circularly or elliptically polarized RF magnetic fields in planes which are generally parallel to the center conductor and extend somewhat radially therefrom and locating bodies of magnetized ferrite material adjacent the center conductor. The remanent magnetization of the ferrite material is sufficient to result in a substantial non-reciprocal interaction between dipoles of the ferrite material and the circularly polarized magnetic fields. The direction of this magnetization is substantially parallel, in the areas of interaction, with the field produced by a D.C. current carried by the center conductor of the strip line. Thus, a pulse of D.C. current will reverse the direction of the remanent magnetization and cause the direction of non-reciprocal interaction to switch. This technique for switching has proved quite satisfactory and at the same time avoids the use of external magnets and associated equipments and results in a compact non-reciprocal wave transmission switch which may be designed to operate as an isolator or a differential phase shifter. Specific embodiments of my invention are discussed in detail below.

Figure 1:
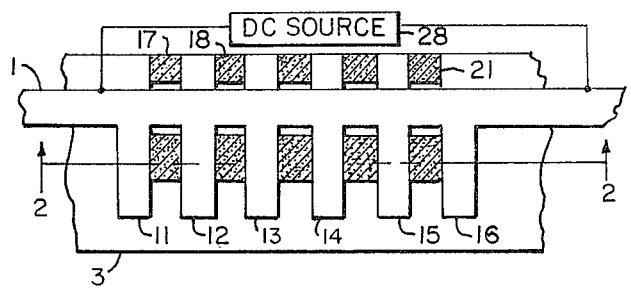
FIGURES 1 and 2 are plan and front sectional views of a three element strip transmission line incorporating features of the invention to provide a non-reciprocal or differential phase shift.
Figure 2:
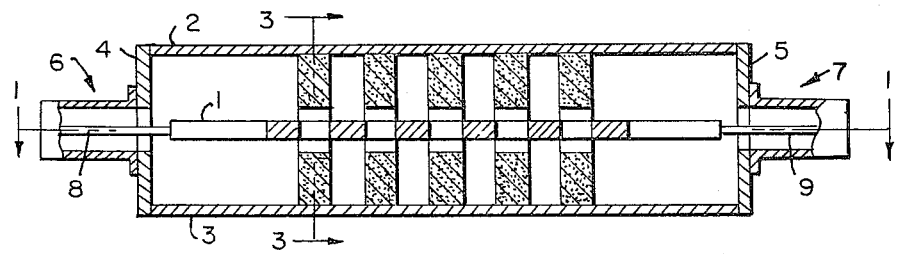

An embodiment including both principal features of the invention is illustrated in FIGURES 1 and 2 and includes a section of strip transmission line formed by a center strip conductor 1 and two ground plane conductors 2 and 3 disposed parallel and coextensive therewith. The transverse end plates 4 and 5 attached to the ground plane conductors 2 and 3 at the ends form a rigid structure and also support coaxial connectors 6 and 7 which have their center conductors 8 and 9 electrically connected to the strip conductor 1.

In operation, waves are launched into one end of the strip transmission line and are conducted therethrough in a TEM mode. The plurality of parallel wave paths mentioned above are created by a number of fingers such as fingers 11 to 16 shown in FIGURE 1 extending from the strip conductor 1 midway between the ground plane conductors 2 and 3. The spacing between the centers of these fingers and the lengths of the fingers are selected so that waves conducted by adjacent fingers, such as fingers 11 and 12, are substantially out of phase with each other and preferably in phase quadrature. If the waves are in phase quadrature and the magnetic fields of waves are perpendicular to each other, then the fields will combine to produce circularly polarized magnetic fields. If the phase differential is other than quadrature and/or if the fields are other than perpendicular, then the fields will combine to produce elliptically polarized magnetic fields. In either event, a component of circular polarization of the RF magnetic fields will be produced in the area between the fingers.

Figure 4:
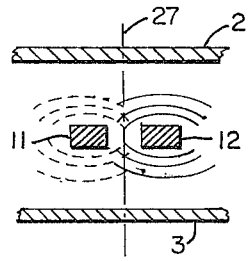
FIGURES 3 and 4 are sectional views of the device shown in FIGURES 1 and 2 to illustrate the relative orientations of D.C. and RF magnetic fields which result in the non-reciprocal interaction between RF waves and magnetized ferrite material.
Figure 3:
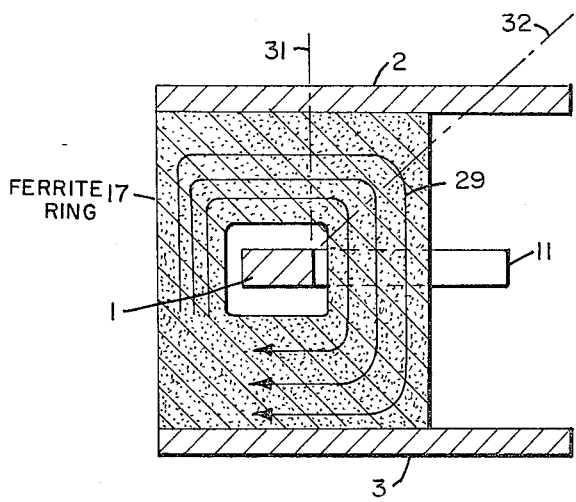

Ring shaped bodies of ferrite material 17 to 21 are disposed to encircle the center strip conductor 1 and extend between the fingers 11 to 16. The ferrite bodies are preferably magnetized before assembly. The general direction of this magnetization of each of the ferrite bodies 17 to 21 is illustrated in FIGURE 3 by the solid lines 29 which follow the contour of the ferrite body. The general shape of the magnet fields of the radio frequency waves conducted in adjacent fingers is illustrated in FIGURE 4. This represents, for example, the waves conducted by adjacent fingers 11 and 12, the fields associated with fingers 11 and 12 being represented by a broken and solid lines, respectively. It is seen that along an area between the fingers represented by a plane 27 the RF magnetic fields from adjacent fingers are transverse to each other and at some points are precisely orthogonal. As already mentioned, the spacing between fingers and lengths of fingers are designed so that waves conducted by adjacent fingers are substantially in phase quadrature. As a result, the fields illustrated in FIGURE 4 will combine along the plane 27 to produce components of circularly polarized RF magnetic field and the plane of this circular polarization will be transverse to the plane 27 and also transverse the direction of magnetization of the portion of the ferrite body between the fingers located along the plane 27. The area of the ferrite body 17 wherein magnetization is directed transverse to the plane of such circularly polarized magnetic fields is illustrated in FIGURE 3 as that area falling between the planes 31 and 32. Thus, non-reciprocal interaction between components of the waves conducted by the structure and a portion of the magnetized ferrite body occurs.

In operation, waves launched into terminal 6 experience a different phase shift than waves launched into terminal 7. The direction of this differential phase shift can be switched by reversing the direction of the remanent magnetization of the ferrite bodies 17 to 21. This is accomplished by feeding a pulse of D.C. current through the center conductor 1 from a suitable source such as 28. The pulse of current produces a magnetic field similar in conformation to the remanent magnetization but of opposite direction which reverses the direction of the remanent magnetization. Thus, the direction of differential phase shift is reversed.

Figure 5:
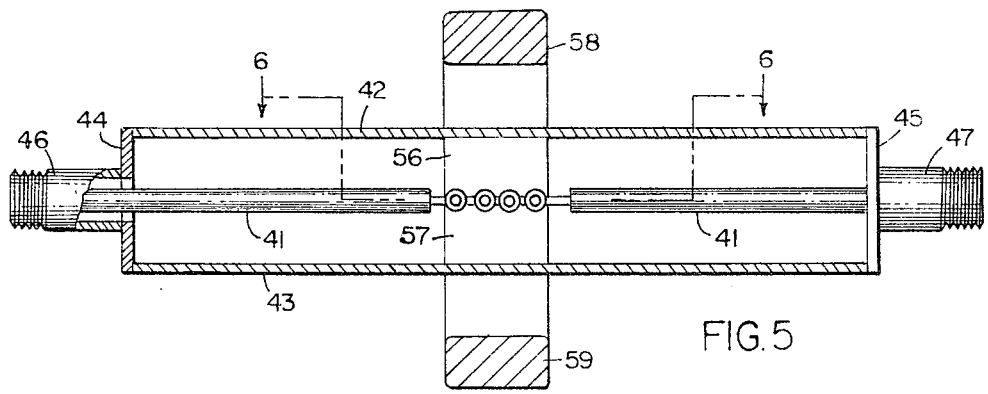
FIGURES 5 and 6 illustrate an embodiment of the invention including a section of three element transmission line a part of which is comprised of a delay line structure loaded with sheets of ferrite material magnetized by a non-symmetrical arrangements of external magnets.
Figure 6:
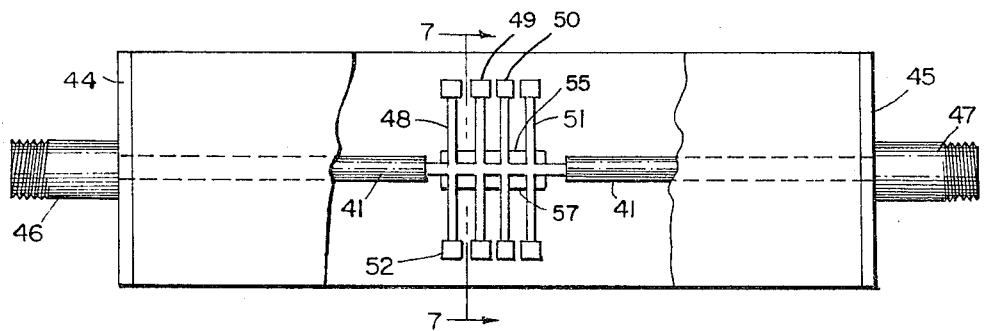
Figure 7:
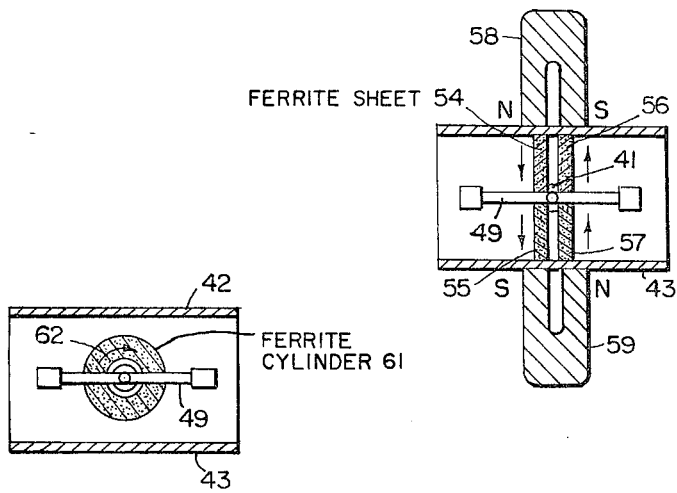
FIGURE 7 is a sectional view of the device of FIGURES 5 and 6.

Another embodiment including external magnets to magnetize the ferrite bodies is illustrated in FIGURES 5 to 7 includes a rod center conductor 41 between and coextensive with two ground plane conductors 42 and 43 attached at their ends by transverse plates 44 and 45 which support coaxial connectors 46 and 47 having their center conductors electrically connected to the rod conductor 41. A portion of the rod conductor 41 includes a plurality of transverse rods 48 to 51 disposed parallel to each other in a plane between the plates 42 and 43. Both ends of each of the rods 48 to 51 are loaded with a movable sleeve of conductive material such as 52 for adjusting the point of reflection of waves conducted by the rods in directions substantially transverse to the length of the center conductor 41. Four sheets of ferrite material 54 to 57 are disposed in planes transverse to the rods 48 to 51 which pass through the spaces between fingers at the base of the fingers.

The ferrite bodies are magnetized by a pair of external magnets 58 and 59 located with their poles against the ground plates adjacent the ferrite bodies as shown in FIGURES 5 and 7. Thus, two of the ferrite sheets 54 and 55 which lie in the same plane are magnetized in one direction while the other two which lie in a parallel plane are magnetized in the opposite direction.

In operation RF waves are conducted by the rod center conductor 41 in conjunction with the ground plane plates 42 and 43 in a TEM mode in a direction generally coextensive with the conductor 41. Portions of these waves are conducted to the transverse rods 48 to 51 in directions substantially perpendicular thereto and the magnetic fields of these waves overlap in the spaces between the rods 48 to 51. The length and positioning of the rods 48 to 51 relative to each other is such that waves conducted by adjacent rods are substantially in phase quadrature and so the overlapping magnetic fields in spaces between rods produce circularly polarized components of the wave magnetic fields. These circularly polarized components extend to the ferrite bodies 54 to 57 which combine with the magnets 58 and 59 to form a substantially closed magnetic path. Thus, a non-reciprocal interaction occurs between the wave field components and the ferrite bodies.

Figure 8:
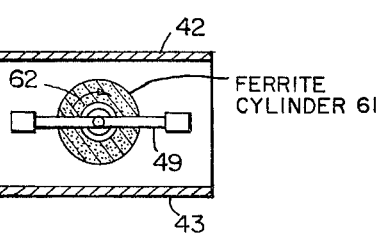
FIGURE 8 is a sectional view of the device of FIGURES 5 and 6 to illustrate a readily switched non-reciprocal phase shifter.

An alternate embodiment to that in FIGURES 5 to 7 which avoids the use of external magnets is illustrated in FIGURE 8 and is identical to that in FIGURES 5 to 7 except the ferrite sheets 54 to 57 are replaced by a hollow cylinder of ferrite material 61 having openings to accommodate the transverse rods 48 to 51. In this embodiment, the remanent magnetization of the hollow cylindrical ferrite 61 is indicated by the solid arrow 62. As a result, a substantial portion of the ferrite material occupies space containing circularly polarized components of RF magnetic field and is magnetized transverse to a plane of such components so that non-reciprocal wave transmission occurs. The direction of remanent magnetization is reversed by feeding a pulse of D.C. current through the conductor 41 just as already described with reference to FIGURES 1 to 4.

This concludes the description of non-reciprocal wave conducting structures incorporating features of the invention, whereby a multi-element RF transmission structure is constructed to produce areas of circularly polarized RF magnetic fields at which bodies of mangetized ferrite material are located. In some embodiments, the direction of this magnetization is controlled by current conducted by elements of the structure to switch the direction of non-reciprocal wave transmitting qualities. While specific embodiments of the invention are described incorporating these features, it is to be understood that they are made only by way of example and do not limit the spirit and scope of the invention as set forth in the accompanying claims.

What is claimed is:

1. A non-reciprocal wave conducting device comprising means for producing electromagnetic waves, means for conducting said waves along a plurality of paths which are spaced so that the magnetic fields of waves in adjacent paths overlap and are in different phase, at least one body of ferrite material disposed in the path of said overlapping fields and means for controlling the magnetization of said ferrite body including means for conducting D.C. current through at least a part of said wave conducting means.

2. A non-reciprocal wave conducting device comprising means for producing electromagnetic waves, means for conducting said waves along a plurality of adjacent parallel paths which are spaced so that the magnetic fields of waves in adjacent paths overlap and are in different phase, at least one body of magnetized ferrite material disposed in the paths of said overlapping fields and means for controlling the direction of said magnetization including means for conducting D.C. current through said wave conducting means.

3. A non-reciprocal wave conducting device comprising a transmission line, a plurality of wave conducting structures integral with said multi element transmission line for conducting said waves along a plurality of parallel paths which are spaced so that the magnetic fields of waves in adjacent paths overlap and are substantially in phase quadrature, at least one body of magnetized ferrite material disposed in the path of said overlapping fields and means for switching the direction of said magnetization including means for conducting D.C. current through said transmission line.

4. A non-reciprocal high frequency transmission line comprising means for launching waves along a plurality of paths which are spaced so that the fields of waves in adjacent paths overlap, said overlapping fields being in different phase and combining to produce components of circularly polarized high frequency magnetic field, at least one body of magnetized ferrite material located to intercept said circularly polarized magnetic field components and means for producing a D.C. electric current in said transmission line whereby magnetization of said ferrite body is controlled.

5. A non-reciprocal high frequency transmission line comprising means for launching waves along a plurality of paths which are spaced so that the fields of waves in adjacent paths overlap, said overlapping fields being in different phase and combining to produce components of circularly polarized high frequency magnetic field, at least one body of magnetized ferrite material located to intercept said circularly polarized magnetic fields, and means for producing a D.C. electric current in said transmission line whereby the direction of magnetization of said ferrite body is controlled.

6. A non-reciprocal high frequency transmission line comprising means for launching waves along a plurality of adjacent paths which are spaced so that the fields of waves in different paths overlap, said overlapping fields being in different phase and combining to produce areas of circularly polarized high frequency magnetic field, at least one body of magnetized ferrite material located to intercept said circularly polarized magnetic fields, and means for producing a D.C. electric current in said transmission line in a direction to switch the direction of magnetization of said ferrite body, thereby switching the direction of said non-reciprocal transmission.

7. A differential phase shift device comprising means for conducting high frequency waves along a plurality of parallel paths which are spaced so that the fields of waves in different paths combine to produce components of circularly polarized high frequency magnetic field, at least one body of magnetized ferrite material located to intercept said components and means for producing a current in said conducting means to generate a magnetic field for switching the direction of magnetization of said material, thereby switching the direction of said differential phase shift.

References Cited by the Examiner
UNITED STATES PATENTS

| 2,748,296 | 5/1956 | Lipkin. | |
| 3,016,497 | 1/1962 | Kostelnick | 333—24.1 X |
| 3,064,214 | 11/1962 | Miller | 333—24.3 X |
| 3,102,244 | 8/1963 | Seidel | 333—24.2 |
| 3,162,826 | 12/1964 | Engelbrecht | 333—24.2 X |

HERMAN KARL SAALBACH, *Primary Examiner.*

P. L. GENSLER, *Assistant Examiner.*